United States Patent [19]

Watson et al.

[11] 4,451,173

[45] May 29, 1984

[54] STORAGE POND

[75] Inventors: Eric Watson, Culcheth; Eric Hunter, Leyland, both of England

[73] Assignee: British Nuclear Fuels Limited, Warrington, England

[21] Appl. No.: 396,807

[22] Filed: Jul. 9, 1982

[30] Foreign Application Priority Data

Aug. 13, 1981 [GB] United Kingdom ................. 8124805

[51] Int. Cl.³ ............................................. B65D 25/24
[52] U.S. Cl. ...................................... 405/53; 376/272; 405/128; 405/270
[58] Field of Search ..................... 405/128, 129, 52–58; 376/272; 210/170

[56] References Cited

U.S. PATENT DOCUMENTS

| 734,045 | 7/1903 | Castleman | 405/53 |
| 3,195,310 | 7/1965 | Schroeder | 405/56 |
| 3,252,155 | 5/1966 | Surtees et al. | 405/54 X |
| 3,415,022 | 12/1968 | Schaefer et al. | 405/270 X |
| 3,516,568 | 6/1970 | Fish | 405/55 X |
| 3,581,513 | 6/1971 | Cranmer | 405/56 X |
| 3,736,754 | 6/1973 | Azalbert et al. | 405/53 |
| 3,952,531 | 4/1976 | Turner | 405/55 X |
| 4,068,480 | 1/1978 | LeFever et al. | 405/270 X |

FOREIGN PATENT DOCUMENTS 1440187 6/1976 United Kingdom .

Primary Examiner—Dennis L. Taylor
Attorney, Agent, or Firm—William R. Hinds

[57] ABSTRACT

A pond for the storage of hazardous materials, such as irradiated nuclear fuel elements, under water. Upper (8) and lower (6) impervious membranes extend without interruption beneath the floor (1) of the pond and the edges of the membranes lead into a trench (9) surrounding the pond. Any leakage through the floor is directed normally by the upper membrane (8) into the trench (9). The lower membrane (6) provides an additional impervious barrier in the event of a leak in the upper membrane (8) and again directs the leakage into the trench thereby avoiding contamination of the ground beneath the pond.

4 Claims, 1 Drawing Figure

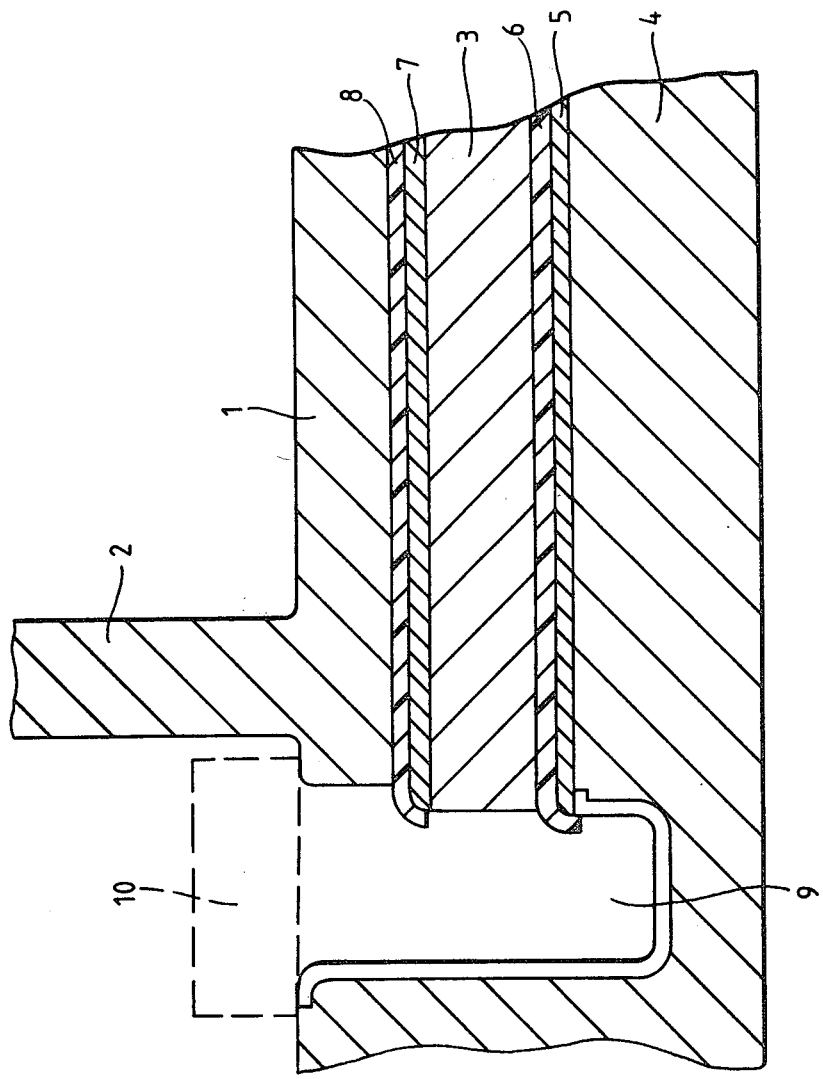

STORAGE POND

BACKGROUND OF THE INVENTION

The present invention concerns ponds for storage of hazardous materials under water.

It is the practice to store irradiated nuclear fuel elements under water in ponds and it is necessary to prevent any leakage in order to avoid contamination of the ground beneath and around the pond. Leakage through the floor of a pond is a particular problem as it is difficult to detect.

SUMMARY OF THE INVENTION

According to the present invention a pond for the storage of hazardous materials comprises a base having upper and lower impervious membranes which extend uninterrupted beneath the floor of the pond, the edges of the membranes leading into a trench surrounding the base so that any leakage through the floor of the pond is directed into the trench.

The arrangement is such that should a fault or leak appear in the upper membrane then any seepage of liquid will be contained by the lower membrane and channelled into the trench.

DESCRIPTION OF THE DRAWING

The invention will be described further, by way of example, with reference to the accompanying diagrammatic drawing which is a section through a part of a storage pond for irradiated nuclear fuel elements.

DESCRIPTION OF THE PREFERRED EMBODIMENT(S)

An above ground storage pond comprises a concrete floor 1 and a concrete side wall 2 supported on a concrete raft 3 which in turn is supported on a concrete foundation 4. The upper surface of the foundation 4 is formed with a waterproof screed 5 which is covered with an impervious membrane 6. Likewise the upper surface of the raft 3 is formed with a waterproof screed 7 which is covered with an impervious membrane 8. The lower membrane 6 and the upper membrane 8 can be a robust plastics material, for example polyurethane or polyethylene. The membrane may also be sandwiched between layers of bituthene or similar bedding material. The membranes extend without interruption beneath the floor of the pond. For example, the membranes can be fabricated from sheets of plastics materials, such as polyurethane or polyethylene, having overlapping longitudinal edges which can be sealed together, such as by welding or adhesive, to form a continuous uninterrupted layer. As an alternative to laying sheets of impervious materials the membranes 6 and 8 can be formed by spraying or pouring and allowing the liquid phase to bond and set.

A trench 9 surrounds the pond, the trench being lined with an impervious material which can be the same as the membranes. The trench can be provided with removable covers 10. The edges of the membranes 6 and 8 are exposed and lead into the trench 9. Alternatively, the impervious lining in the trench can be a continuation of the membrane 6 or the membrane 6 can be welded or the like integral with the trench lining.

The membranes 6 and 8, also the lining in the trench, can be chosen to meet the operational requirements of the pond and the materials to be stored in the ponds. The membranes and lining can be formed from materials other than plastics and, for example, can be steel.

In the event of a flaw in the floor of the pond any leakage of material will be directed by the upper membrane 8 into trench 9. Similarly in the event of a flaw in the upper membrane 8 and the screed 7 any resulting seepage through the raft 3 will be contained by the lower membrane 6 and directed into the trench 9. The lower membrane 6 provides an additional impervious barrier beneath the floor of the pond and the membranes ensure that any leakage is effectively contained within the confines of the pond and does not contaminate the ground beneath and around the pond.

The construction permits leak testing of the lower membrane 6 before laying the floor of the pond. Air passages can be cast into the concrete foundation 4 and the raft 3 can initially be formed with a shallow well in its upper surface to receive a pool of water. The air passages are suitably blanked off and adapted and air under pressure is applied to the passages. Any air passing through the membrane will manifest itself as bubbles in the water well.

We claim:

1. An above ground storage pond for hazardous liquids comprising a support base, a floor on the base, upstanding side walls, a trench surrounding the floor and side walls, and upper and lower impervious members in the base extending uninterrupted beneath the floor and side walls to emerge into the trench whereby any leakage through the floor and side walls is directed into the trench.

2. An above ground storage pond as claimed in claim 1 wherein said impervious members are membranes of plastic material.

3. An above ground storage pond as claimed in claim 2 wherein said trench extends to a depth below the lower plastic membrane, and thus surrounds the floor, walls, and at least that portion of the base through which said membranes extend.

4. An above ground storage pond as claimed in claim 3 wherein said upper and lower membranes are separated by concrete.

* * * * *